Sept. 16, 1924.

S. A. MOSS 1,508,707

CONTROL MECHANISM FOR AEROPLANE SUPERCHARGERS

Filed April 8, 1922

Inventor,
Sanford A. Moss,
by Albert G. Davis
His Attorney.

Patented Sept. 16, 1924.

1,508,707

UNITED STATES PATENT OFFICE.

SANFORD A. MOSS, OF LYNN, MASSACHUSETTS, ASSIGNOR TO GENERAL ELECTRIC COMPANY, A CORPORATION OF NEW YORK.

CONTROL MECHANISM FOR AEROPLANE SUPERCHARGERS.

Application filed April 8, 1922. Serial No. 550,931.

*To all whom it may concern:*

Be it known that I, SANFORD A. MOSS, a citizen of the United States, residing at Lynn, county of Essex, State of Massachusetts, have invented certain new and useful Improvements in Control Mechanisms for Aeroplane Superchargers, of which the following is a specification.

The present invention relates to superchargers for aeroplanes and has for its object to provide an improved controlling mechanism for regulating the degree or amount of supercharging.

As is well known, a supercharger is used to furnish the aeroplane engine with air at sea level or other desired pressure, irrespective of the altitude of the aeroplane and comprises essentially an air compressor which delivers air to the carburetor, or carburetors of the engine. In connection with the use of superchargers it is advisable that the regulation of the supercharger be under the control of the aviator to a certain degree. It is desirable, however, that the arrangement be such that at lower altitudes the aviator cannot supercharge above a predetermined high pressure, a thing likely to cause preignition, while at higher altitudes, it is desirable that the supercharger be not overloaded in its efforts to maintain the desired supercharger pressure. For example, a supercharger designed to provide air at sea level pressure at an altitude of 20,000 feet might be overloaded and damaged if it be attempted to make it provide air at sea level pressure at an altitude of 30,000 feet. On the other hand at an altitude of 10,000 feet the supercharger would be capable of compressing air to a pressure higher than it would be advisable to use in the engine.

More particularly, the object of my invention is to provide an improved regulating or controlling mechanism which, while leaving the control of the supercharging primarily in the hands of the aviator, will prevent automatically either over supercharging or overloading of the supercharger.

For a consideration of what I believe to be novel and my invention, attention is directed to the accompanying description and the claims appended thereto.

Figure 1:
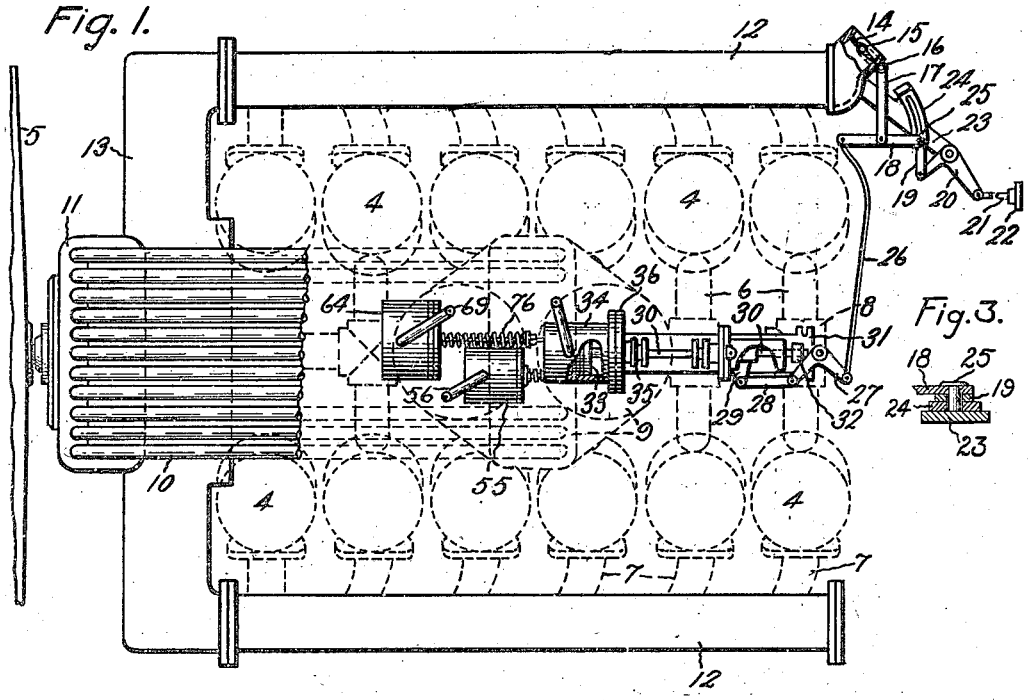
Figure 2:
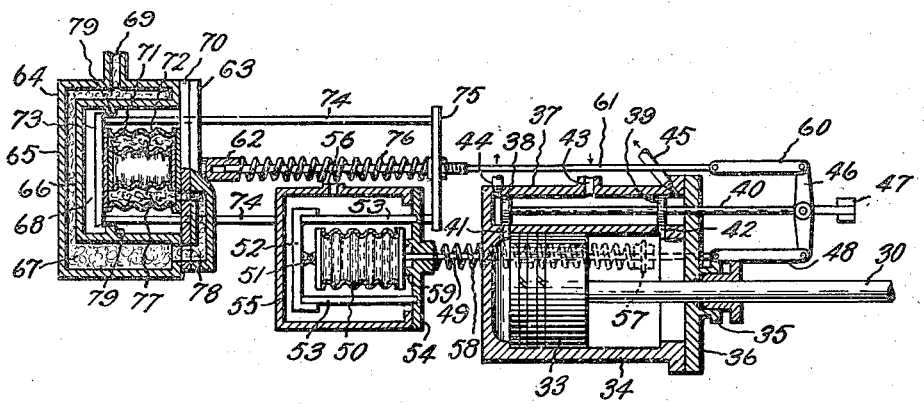

In the drawing, Fig. 1 is a diagrammatic plan view of an aeroplane engine equipped with a supercharger having a control mechanism embodying my invention; Fig. 2 is a sectional view of certain parts of the control mechanism, and Fig. 3 is a detail sectional view of a lever mechanism.

In the present instance I have shown my invention carried out in connection with a supercharger of the type comprising a centrifugal compressor driven by a turbine which in turn is operated by exhaust gases from the aeroplane engine, the flow of exhaust gases to the turbine being regulated by valve means controlling the flow of exhaust gases to atmosphere, this being a known arrangement. It will be understood, however, that the invention may be carried out in connection with any desired type of supercharger drive.

Referring to the drawing, 4 indicates the cylinders of an aeroplane internal combustion engine driving a propeller 5, 6 indicates the intake pipes, and 7 indicates the exhaust pipes, there being an intake pipe and an exhaust pipe for each cylinder. The intake pipes 6 are connected to carburetors indicated diagramatically at 8. Air is supplied to carburetors 8 from a manifold 9 connected by pipes 10 to the discharge side of the supercharger 11. The supercharger is shown diagrammatically only but it will be understood that it may comprise a suitable centrifugal compressor which takes air from the atmosphere, compresses it, and delivers it to the pipes 10, the air in passing through the pipes 10 being cooled prior to delivery to the carburetors. The compressor may be driven by a turbine wheel actuated by exhaust gases from the engine cylinders and to this end exhaust pipes 7 are connected to manifolds 12 which at one end connect with a casing 13 having a suitable nozzle box in which are nozzles for directing the exhaust gases to the turbine wheel. The specific structure of the turbine and compressor forms no part of the present invention and they are accordingly indicated diagrammatically only. It will be understood that they may be of any suitable structure. The flow of exhaust gases from manifolds 12 to the turbine nozzles is regulated by a valve or blast gate 14 in the open end of one of the exhaust manifolds 12, the other exhaust manifold being closed at the end remote from casing 13. When blast gate or valve 14 is closed all exhaust gases from the engine will be delivered to the turbine while when valve 14 is open the exhaust gases will discharge directly to atmosphere. At intermediate positions of valve 14 more or less exhaust gases will be supplied to the turbine as is obvious.

Valve 14 is carried by a spindle 15 journaled in the wall of manifold 12 and fixed on one end of spindle 15 is a crank arm 16 connected by a link 17 to the central portion of a floating lever 18. One end of floating lever 18 is pivotally connected by a link 19 to one arm of a bell crank lever 20, and the other arm is connected to a rod 21 which extends to a point adjacent the aviator and has a suitable handle 22 on its end which the aviator may grasp in moving the rod. Bell crank lever 20 is pivoted at its elbow on a fixed support 23, and carried by fixed support 23 is a fixed arcuate guide 24 in which slides a pin 25 on the end of floating lever 18. The other end of floating lever 18 is connected by a rod 26 to one arm of bell crank lever 27, the other arm being connected by a link 28 to an ear 29 fixed on a rod 30 which forms a part of a servo motor.

Bell crank lever 27 is suitably pivoted at its elbow on a fixed frame work 31 which carries also a guide 32 for the free outer end of rod 30. The inner end of rod 30 is connected to a piston 33 which slides in a cylinder 34, the rod passing through a suitable stuffing box 35 in the head 36 of the cylinder. Associated with piston 33 and cylinder 34 is a pilot valve comprising a casing 37 in which are two valves 38 and 39 carried by a pilot valve stem 40. Valves 38 and 39 cooperate with openings 41 and 42 which communicate with cylinder 34 on opposite sides of piston 33. At the central portion of pilot valve casing 37 is an inlet opening 43 and at its two ends are discharge openings 44 and 45. This forms a known arrangement of servo motor and it will be understood that the connections may include a suitable follow up device to prevent overtravel, such apparatus and its operation being well known.

Pilot valve stem 40 is connected at its outer end to the central portion of a floating lever 46 and there is provided for its outer end a suitable guide 47. One end of floating lever 46 is connected by a link 48 to the outer end of a stem 49 the inner end of which is connected to one end of a pressure responsive device here shown in the form of a sylphon diaphragm 50. The other end of sylphon diaphragm 50 is connected by a link 51 to a cross piece 52 carried by posts 53 fixed to a cover plate 54 which covers the open end of a casing 55 in which diaphragm 50 is located.

The interior of casing 55 is connected by a conduit 56 with manifold 9 so that the pressure responsive device 50 is normally subjected on its exterior to the supercharger air pressure, i. e., the pressure on the delivery side of the compressor furnishing air to the engine carburetors. On stem 49 is an adjustable collar 57 between which and cover plate 54 is arranged a coil spring 58. It will be seen that with increase in pressure in casing 55 such increase in pressure will tend to collapse diaphragm 50 and since the left hand end of the diaphragm is fixed to the frame the right hand end, that is, the end to which stem 49 is connected, will be moved toward the left, thereby moving stem 49 toward the left and in a direction to compress spring 58 which spring acts in a direction to oppose compression of the diaphragm.

Diaphragm 50 may or may not contain a certain amount of air depending on the operating conditions desired. If the diaphragm contains a certain amount of air it will be responsive to both the temperature and the pressure of the air delivered by the supercharger. If it is desired to have the diaphragm respond to pressure only, it will be exhausted of air. I may for example, have air at sea level pressure in diaphragm 50 and insert it directly in conduit 9 so as to subject the air within the diaphragm to the temperature of the air delivered by the supercharger. This will give increase of the pressure inside the diaphragm if the temperature of the supercharger air increases. In any event the arrangement is such that the air pressure in diaphragm 50, if any, plus the tension of spring 58 will prevent collapse of the diaphragm at pressures below the desired maximum supercharger pressure. 59 is a suitable stop to limit movement of diaphragm 50 in the one direction.

The other end of floating lever 46 is connected by a link 60 to the outer end of a rod 61, the inner end of which is carried in a guide 62 on the cover plate 63 of a housing 64. Housing 64 comprises two walls 65 and 66 which provide an outer chamber 67 and an inner chamber 68. Outer chamber 67 is connected by a conduit 69 to manifold 9 whereby such chamber is subjected to the pressure on the delivery side of the supercharger. Inner chamber 68 is connected through a suitable opening 70 in cover plate 63 to altitude atmosphere. Carried by and fixed to cover plate 63 is a differential pressure responsive device comprising outer and inner sealed diaphragm members 71 and 72 which at their free ends are connected to a base plate 73. Base plate 73 is connected by side rods 74 to an adjustable cross head 75 fixed on rod 61, and arranged between cross head 75 and guide 62 is a suitable compression spring 76. The interior of inner diaphragm 72 is exhausted to a predetermined extent so that it contains a vacuum. The annular chamber 77 formed between diaphragms 71 and 72 is in communication with chamber 67 through a passage 78 formed in cover plate 63 so that chamber 77 is subjected to the supercharger pressure. With this arrangement the supercharger pressure acts on the differential diaphragm structure over an area equal to that of the annular chamber 77, while the altitude atmospheric pressure acts on the differential diaphragm structure over an area equal to the area of chamber 77 plus the area of inner diaphragm 72. It will thus be seen that the altitude atmospheric pressure acts over a larger area than does the supercharger pressure and that these pressures are opposed to each other. At 79 are suitable stop means which serve to limit the collapse of diaphragms 71 and 72. The arrangement is such that as long as the ratio between the supercharger pressure and the atmospheric pressure does not exceed a predetermined amount, the atmospheric pressure will hold base 73 against stops 79 but in case the supercharger pressure exceeds the atmospheric pressure by more than a predetermined ratio the differential pressure device will be expanded or moved toward the left, thereby pulling rod 61 toward the left. The supercharger pressure ratio is thus limited and since the supercharger pressure ratio is directly proportional to the speed, the supercharger speed is limited.

The operation is as follows:—The aviator when leaving the ground may set the blast gate or valve 14 in wide open position by means of his hand control rod 21, and after reaching an altitude at which he desires to supercharge he may close the blast gate partially so as to supercharge to a desired degree up to the predetermined maximum amount, or he may close the blast gate completely which will give him the highest predetermined supercharging pressure permissible. Assume for example that upon reaching a certain altitude the aviator completely closes blast gate or valve 14 as shown in Fig. 1. The supercharger will now begin to operate and rapidly build up the supercharger pressure. As soon as the supercharger pressure exceeds the predetermined maximum amount, for example, sea level pressure, such supercharger pressure acting on diaphragm 50 will collapse at a certain amount, thereby moving rod 49 toward the left and pulling down on the one end of floating lever 46, the other end, which at this time is stationary, acting as a fulcrum. This movement of floating lever 46 will lower pilot valves 38 and 39 uncovering openings 41 and 42. Elastic fluid will then enter cylinder 34 beneath piston 33 by way of conduit 43 and opening 41, moving cylinder 33 toward the right, the fluid pressure in the cylinder on the right hand side of piston 33 escaping through opening 42 and conduit 45. This movement of piston 33 will turn bell crank lever 27 on its pivot moving the left hand end of floating lever 18 in a direction to open blast gate or valve 14 to a predetermined extent. This will permit the escape of exhaust gases directly to atmosphere, thereby lowering the pressure in casing 13 to decrease the speed of the supercharger and hence reduce the supercharger pressure, bringing it back to the desired predetermined maximum value. If now, the aviator leaves his hand control in this position, the diaphragm 50 and mechanism controlled thereby will act automatically to maintain the supercharger pressure at the desired maximum value, movement of diaphragm 50 in contracting and expanding due to changes in the supercharger acting to move valve 14 away from and toward closed position. The aviator, by means of his hand control cannot set the apparatus to obtain a pressure higher than this, although he can at any time move it to decrease the supercharger pressure to a value below the maximum. When the aviator moves his hand control, bell crank lever 20 moves the right hand end of floating lever 18 along guide slot 24, the left hand end turning on the end of rod 26 as a fulcrum.

In case an altitude is reached at which the supercharger, due to the low altitude atmospheric pressure, would reach an unduly high speed if it maintained the supercharger pressure at the maximum value, then the differential pressure mechanism comes into play to actuate the valve or blast gate 14 as follows:—When the surrounding or altitude atmospheric pressure decreases below a predetermined value, the supercharger pressure acting on the portion of base plate 73 which lies over annular chamber 77 between diaphragms 71 and 72 is sufficient to overcome the altitude atmospheric pressure acting on the outside of base plate 73, plus spring 76 and will expand the diaphragms, i. e., move them toward the left. This will move rod 61 toward the left thereby turning floating lever 46 on the end of link 48 as a pivot and moving the pilot valve in a direction to effect a movement of valve or blast gate 14 toward open position in the manner already described, thereby decreasing the supercharger pressure. The differential apparatus will thus operate continuously to prevent a supercharger pressure more than a predetermined ratio above the surrounding altitude atmospheric pressure. The operation of both diaphragms 50 and the differential diaphragm structure 71—72 in a direction opposite to that described is obvious from the explanation already given.

In connection with the servo-motor, I may connect the inlet conduit 43 with any source of suitable pressure. Preferably I use the supercharger pressure to actuate this mechanism as it is a readily available supply.

I may, however, if desired, use oil pressure from the lubricating system or pressure from any other available source.

With the above described arrangement it will be seen that the aviator may supercharge by means of his hand control to any desired value below the maximum and for all such values diaphragms 50 and differential diaphragm structures 71, 72 do not come into play. However, the diaphragm 50 stands ready to take control to prevent over supercharging at any time while the diaphragm structure 71, 72 stands ready to take control to prevent overspeeding the supercharger. The aviator thus has complete control of the supercharger subject to the limitations placed on it by the pressure responsive devices. On the other hand, however, when maximum supercharging is desired the aviator may entirely relinquish his hand control whereupon the pressure responsive devices will assume complete control and automatically regulate the supercharger. In cases where I leave air within chamber 50 and place it within conduit 9 so that it attains the temperature of the supercharging air the pressure of supercharging which is automatically held will increase with the temperature, and the weight or density of the charge fed to the gas engine cylinders is thereby automatically controlled wholly or in part, instead of the pressure merely.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. In combination, an internal combustion engine, a supercharger for supplying compressed air thereto, manually operated means for controlling said supercharger, means for limiting the degree of supercharging obtainable with said manually operated means, and means for preventing the supercharger pressure from exceeding the atmospheric pressure by more than a predetermined ratio.

2. In combination, an internal combustion engine, a supercharger for supplying compressed air thereto, means responsive to the supercharger pressure for limiting the degree of supercharging obtainable with said supercharger, and means responsive to the ratio between the supercharger pressure and the altitude atmospheric pressure for preventing the supercharger pressure from exceeding the atmospheric pressure by more than a predetermined ratio.

3. In combination, an internal combustion engine, a supercharger for supplying compressed air thereto, manually operated means for controlling said supercharger, and means responsive to the ratio between the supercharger pressure and altitude atmospheric pressure for preventing the supercharger pressure from exceeding the atmospheric pressure by more than a predetermined ratio.

4. The combination with an aeroplane having an internal combustion engine, a supercharger supplying air to the engine, and means for controlling the supercharger, of operating means for said controlling means comprising means responsive to the supercharger pressure and means responsive to the ratio between the supercharger pressure and the surrounding atmospheric pressure.

5. The combination with an aeroplane having an internal combustion engine, a supercharger supplying air to the engine, and means for controlling the supercharger, of operating means for said controlling means comprising a floating lever, a manually operated member connected to said floating lever, and means responsive to the ratio between the supercharger pressure and the surrounding atmospheric pressure connected to said floating lever.

6. The combination with an aeroplane having an internal combustion engine, a supercharger supplying air to the engine, and means for controlling the supercharger, of operating means for said controlling means comprising a floating lever, a manually operated member connected to said floating lever, and means responsive to the supercharger pressure and to the ratio between the supercharger pressure and the surrounding atmospheric pressure connected to said floating lever.

In witness whereof I have hereunto set my hand this seventh day of April, 1922.

SANFORD A. MOSS.